United States Patent
Dai et al.

(10) Patent No.: US 12,476,872 B1
(45) Date of Patent: Nov. 18, 2025

(54) PHYSICAL LAYER TRANSCEIVER WITH COLLISION AVOIDANCE IN HIGH NOISE AND INTERFERENCE ENVIRONMENT

(71) Applicant: Marvell Asia Pte Ltd, Singapore (SG)

(72) Inventors: Shaoan Dai, San Jose, CA (US); Wensheng Sun, San Jose, CA (US); Xing Wu, Palo Alto, CA (US)

(73) Assignee: MARVELL ASIA PTE LTD, Singapore (SG)

(*) Notice: Subject to any disclaimer, the term of this patent is extended or adjusted under 35 U.S.C. 154(b) by 326 days.

(21) Appl. No.: 17/677,865

(22) Filed: Feb. 22, 2022

Related U.S. Application Data (60) Provisional application No. 63/304,338, filed on Jan. 28, 2022, provisional application No. 63/152,237, filed on Feb. 22, 2021.

(51) Int. Cl.
   *H04L 41/0896* (2022.01)
(52) U.S. Cl.
   CPC .................. *H04L 41/0896* (2013.01)
(58) Field of Classification Search
   CPC .................................................. H04L 41/0896
   USPC .......................................................... 370/468
   See application file for complete search history.

(56) References Cited

U.S. PATENT DOCUMENTS

| | | |
|---|---|---|
| 2001/0038674 A1 | 11/2001 | Trans |
| 2003/0128451 A1 | 7/2003 | Ohta et al. |
| 2004/0179588 A1 | 9/2004 | Kuffner et al. |
| 2017/0215082 A1* | 7/2017 | Hwang ............... H04W 74/006 |
| 2018/0070321 A1* | 3/2018 | Hessler ............... H04W 52/325 |
| 2021/0055980 A1 | 2/2021 | Chen et al. |
| 2021/0058225 A1* | 2/2021 | Yu ............................. H04L 7/02 |

\* cited by examiner

*Primary Examiner* — Chi Tang P Cheng (57) ABSTRACT

Systems and methods for using a physical layer transceiver (PHY) of an automobile to avoid data signal collision on a high noise or interference automotive multi-drop communication link are provided. A signal is received at a first PHY via a multi-drop communication link in a high noise or interference automotive environment. The received signal is separated into a first spectral component corresponding to a first logic level and into a second spectral component corresponding to a second logic level. Based on analysis of the first and second spectral components, respectively, a determination is made as to whether a second PHY device is concurrently transmitting data on the link, by determining whether both the first and second logic levels are detected in the first and second spectral components within a threshold period of time of one another. The first PHY device is permitted to transmit, or prevented from transmitting, data via the link based on whether the second PHY device is transmitting data on the link.

20 Claims, 5 Drawing Sheets

PHYSICAL LAYER TRANSCEIVER WITH COLLISION AVOIDANCE IN HIGH NOISE AND INTERFERENCE ENVIRONMENT

CROSS-REFERENCE TO RELATED APPLICATIONS

This disclosure claims the benefit under 35 U.S.C. § 119(e) of commonly-assigned United States Provisional Patent Applications Nos. 63/152,237, filed on Feb. 22, 2021; and 63/304,338 filed on Jan. 28, 2022. Each of the aforementioned provisional patent applications is hereby incorporated by reference herein in its respective entirety.

This disclosure relates to communication networks and, more particularly, to physical layer transceivers, methods, and computer-readable media for avoiding collisions (sometimes referred to as link contention) in the presence of interference.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

Ethernet is designed to support the transmission and receipt of Ethernet frames at a rate of ten megabits per second (10 Mb/s) across a variety of applications. Ethernet uses physical layer transceivers (PHYs), such as 10BASE-T1S, as defined by the Institute of Electrical and Electronics Engineers 802.3cg Ethernet standard. 10BASE-T1S PHYs are called upon to operate in severely constrained environments, such as automotive and industrial environments in which various types of noise and interference make it difficult to avoid collisions by detecting when other PHYs are transmitting data.

It is desirable for 10BASE-T1S PHYs to reliably detect when another PHY is transmitting data on a multi-drop signal link, in an effort to avoid a collision, despite the presence of electromagnetic or other types of noise and/or interference.

SUMMARY

Embodiments described herein provide systems and methods for collision avoidance in a multi-drop communication network utilizing a physical layer transceiver. According to one such method, a signal is received at a first PHY via a multi-drop communication link in a high noise or interference automotive environment. The received signal is separated into a first spectral component corresponding to a first logic level and into a second spectral component corresponding to a second logic level. Based on analysis of the first and second spectral components, respectively, a determination is made as to whether a second PHY device is concurrently transmitting data on the link, by determining whether both the first and second logic levels are detected in the first and second spectral components within a threshold period of time of one another. The first PHY device is permitted to transmit, or prevented from transmitting, data via the link based on whether the second PHY device is transmitting data on the link.

In a further aspect, separating the received signal into a first spectral component and a second spectral component comprises feeding the received signal through a first bandpass filter to generate the first spectral component of the received signal; and feeding the received signal through a second bandpass filter to generate the second spectral component of the received signal. Analyzing the first and second spectral components comprises determining a first magnitude of the first spectral component and a second magnitude of the second spectral component; and detecting whether a differential Manchester Encoding (DME) encoded signal is present in the received signal by comparing the first magnitude and second magnitude to one or more thresholds.

In a further aspect, detecting whether the DME encoded signal is present in the received signal comprises detecting that the first magnitude exceeds a first magnitude threshold during a first time window and the second magnitude exceeds a second magnitude threshold during a second time window; and in response to detecting that the first magnitude exceeds the first magnitude threshold during the first time window and the second magnitude exceeds the second magnitude threshold during the second time window, determining that the DME encoded signal is present in the received signal.

In a further aspect, the method further comprises, in response to determining that the DME encoded signal is present in the received signal, temporarily preventing the physical layer transceiver from transmitting data via the multi-drop communication link for at least a minimum time duration.

In a further aspect, detecting whether the DME encoded signal is present in the received signal comprises detecting that the first magnitude fails to exceed a first magnitude threshold during a first time window or the second magnitude fails to exceed a second magnitude threshold during a second time window; and, in response to detecting that the first magnitude fails to exceed the first magnitude threshold during the first time window or the second magnitude fails to exceed the second magnitude threshold during the second time window, determining that the DME encoded signal is absent from the received signal.

In a further aspect, the method further comprises, in response to determining that the DME encoded signal is absent from the received signal, permitting the physical layer transceiver to transmit data via the multi-drop communication link.

In a further aspect, the first bandpass filter has a first center frequency that corresponds to a first frequency of a logic zero DME signal and the second bandpass filter has a second center frequency that corresponds to a second frequency of a logic one DME signal.

In a further aspect, the second center frequency is selected to be approximately twice as large as the first center frequency.

In a further aspect, the method further comprises feeding the received signal through a comparator fed with a threshold voltage to generate a filtered version of the received signal, with the filtered version of the signal being fed to the first bandpass filter and the second bandpass filter instead of the signal received at the physical layer transceiver, low amplitude noise being filtered out from the filtered version of the signal.

In accordance with another aspect, a physical layer transceiver (PHY) is provided for avoiding data signal collision on a high noise or interference automotive multi-drop communication link of an automobile. The PHY comprises an input port and control circuitry. The input port is configured to receive a signal via a multi-drop communication link in a high noise or interference automotive environment. The control circuitry is configured to separate the received signal into a first spectral component corresponding to a first logic level and into a second spectral component corresponding to a second logic level; determine, based on analysis of the first and second spectral components, respectively, whether a second PHY device is concurrently transmitting data on the link, by determining whether both the first and second logic levels are detected in the first and second spectral components within a threshold period of time of one another; and control whether the first PHY device is permitted to transmit, or prevented from transmitting, data via the link based on whether the second PHY device is transmitting data on the link.

In a further aspect, the PHY further comprises a first bandpass filter configured to generate the first spectral component of the received signal; a second bandpass filter configured to generate the second spectral component of the received signal; a first magnitude detector configured to determine a first magnitude of the first spectral component; and a second magnitude detector configured to determine a second magnitude of the second spectral component; and the control circuitry is further configured to detect whether a differential Manchester Encoding (DME) encoded signal is present in the received signal by comparing the first magnitude and second magnitude to one or more thresholds.

In a further aspect, the control circuitry is configured to detect whether the DME encoded signal is present in the received signal by detecting that the first magnitude exceeds a first magnitude threshold during a first time window and the second magnitude exceeds a second magnitude threshold during a second time window; and, in response to detecting that the first magnitude exceeds the first magnitude threshold during the first time window and the second magnitude exceeds the second magnitude threshold during the second time window, determining that the DME encoded signal is present in the received signal.

In a further aspect, the control circuitry is further configured to, in response to determining that the DME encoded signal is present in the received signal, temporarily prevent the physical layer transceiver from transmitting data via the multi-drop communication link for at least a minimum time duration.

In a further aspect, the control circuitry is configured to detect whether the DME encoded signal is present in the received signal by detecting that the first magnitude fails to exceed a first magnitude threshold during a first time window or the second magnitude fails to exceed a second magnitude threshold during a second time window; and, in response to detecting that the first magnitude fails to exceed the first magnitude threshold during the first time window or the second magnitude fails to exceed the second magnitude threshold during the second time window, determining that the DME encoded signal is absent from the received signal.

In a further aspect, the control circuitry is further configured to, in response to determining that the DME encoded signal is absent from the received signal, permit the physical layer transceiver to transmit data via the multi-drop communication link.

In a further aspect, the first bandpass filter has a first center frequency that corresponds to a first frequency of a logic zero DME signal and the second bandpass filter has a second center frequency that corresponds to a second frequency of a logic one DME signal.

In a further aspect, the second center frequency is selected to be approximately twice as large as the first center frequency.

In a further aspect, the PHY further comprises a comparator fed with a threshold voltage and configured to generate a filtered version of the received signal, with the filtered version of the signal being fed to the first bandpass filter and the second bandpass filter instead of the signal received at the physical layer transceiver, low amplitude noise being filtered out from the filtered version of the signal.

In accordance with another aspect, a non-transitory computer-readable medium is provided having instructions stored thereon that, when executed by control circuitry, cause the control circuitry to: receive a signal at a first physical layer transceiver (PHY) via a multi-drop communication link in a high noise or interference automotive environment; separate the received signal into a first spectral component corresponding to a first logic level and into a second spectral component corresponding to a second logic level; determine, based on analysis of the first and second spectral components, respectively, whether a second PHY device is concurrently transmitting data on the link, by determining whether both the first and second logic levels are detected in the first and second spectral components within a threshold period of time of one another; and control whether the first PHY device is permitted to transmit, or prevented from transmitting, data via the link based on whether the second PHY device is transmitting data on the link.

In a further aspect, the non-transitory computer-readable medium further has instructions stored thereon that, when executed by the control circuitry, cause the control circuitry to: receive a signal at a first physical layer transceiver (PHY) via a multi-drop communication link; feed the received signal through a first bandpass filter to generate a first spectral component of the received signal; feed the received signal through a second bandpass filter to generate a second spectral component of the received signal; determine a first magnitude of the first spectral component and a second magnitude of the second spectral component; and detect whether a differential Manchester Encoding (DME) encoded signal is present in the received signal based on the first magnitude and second magnitude.

BRIEF DESCRIPTION OF THE DRAWINGS

Further features of the disclosure, its nature and various potential advantages will become apparent upon consideration of the following detailed description, taken in conjunction with the accompanying drawings, in which like reference characters refer to like parts throughout, and in which.

DETAILED DESCRIPTION

In accordance with implementations of the present disclosure, PHY transceivers, methods, and computer-readable media are disclosed for reliably detecting when another PHY is transmitting data on a multi-drop signal link, in an effort to avoid a collision, despite the presence of electromagnetic or other types of noise and/or interference. Prior approaches to detecting other PHYs transmitting on a multi-drop signal link are based on signal level or detection of echo pattern correlation. When strong interference appears, however, it can cause false detection and result in network communication failure, since PHYs would mistake noise on the link for data that other PHYs might be transmitting on the link. Signals that are encoded according to certain encoding algorithms, such as Differential Manchester Encoding (DME), that are used for Ethernet communication, have certain characteristics that are exploited to facilitate reliable detection of when a PHY is transmitting data on a multi-drop signal link. For DME-encoded signals, in particular, logic highs and logic lows by definition correspond to two distinct frequency spectra. Additionally, when analyzing a stream of DME data over a time window, that stream necessarily includes a mix of logic highs and logic lows within that time window. By exploiting these signal characteristics, logic highs and logic lows can be detected by detecting their respective frequency spectra in a received signal stream, and it can be determined whether another PHY is transmitting data on the link by detecting windows or periods of time within which the stream includes both logic highs and logic lows. This permits a first PHY device to avoid collisions by controlling whether the first PHY device is permitted to transmit, or prevented from transmitting, data via the link based on a determination of whether a second PHY device is concurrently transmitting data on the link. Among other advantages over prior approaches, the transceivers, methods, and computer-readable media herein have a higher noise tolerance since they are insensitive to interference amplitude.

Figure 1:
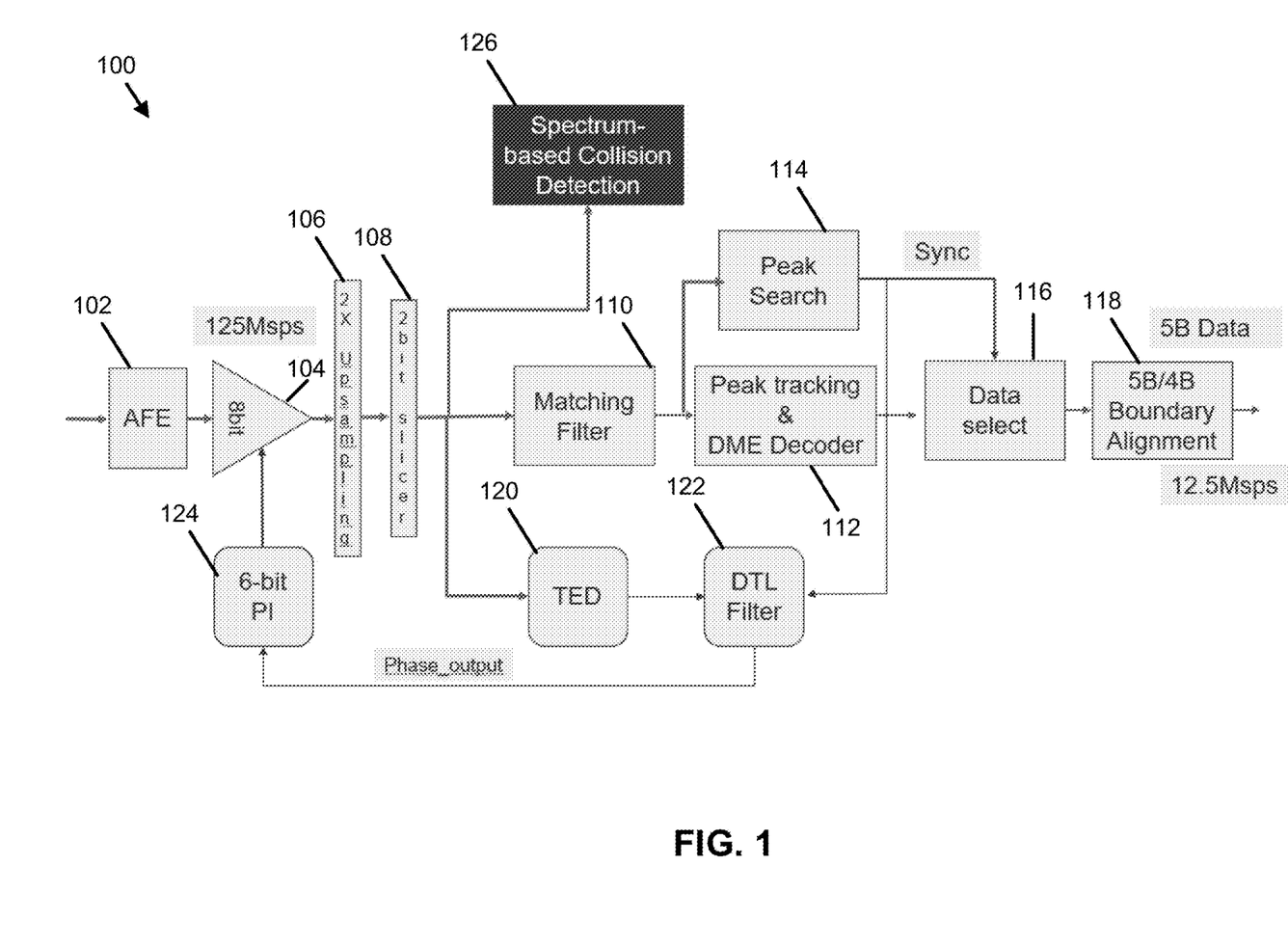
FIG. 1 is a schematic representation of aspects of a physical layer transceiver, in accordance with an embodiment of the present disclosure.

FIG. 1 is a block diagram of a physical layer transceiver (PHY) 100, in accordance with an embodiment of the present disclosure. PHY 100 includes an analog front end (AFE) 102, an 8-bit 125 mega-samples per second (Msps) analog-to-digital converter (ADC) 104, an up-sampler 106, a 2-bit slicer 108, a matching filter 110, peak search circuitry 114, peak tracking circuitry and DME decoder 112, data select circuitry 116, boundary alignment circuitry 118 (e.g., for 5B/4B boundary alignment), a digital timing loop that includes a timing error detector (TED) 120, a digital timing loop (DTL) filter 122, and a 6-bit phase interpolator (PI) 124, and a spectrum-based collision avoidance module 126. AFE 102 includes analog signal conditioning circuitry that uses analog amplifiers, filters, and/or the like to condition a received signal into a form (e.g., at an appropriate signal level) suitable for ADC 104. ADC 104 converts the analog signal received from AFE 102 into a digital signal for subsequent digital signal processing. Up-sampler 106 up-samples a sequence of digital signal samples received from ADC 104 to produce an approximation of the sequence that would have been obtained by sampling the signal at a higher rate (e.g., two or more multiples of the rate at which ADC 104 samples the analog signal from AFE 102). 2-bit slicer 108 is an optional component that slices digital samples from up-sampler 106 into slices of a fixed number of bits, to facilitate processing of data in smaller bit widths. Matching filters 110 improve a signal-to-noise ratio of the signal received from ADC 104 or from 2-bit slicer 108 in embodiments that include slicer 108) by correlating the signal with two or more signal templates to detect the presence of logic low signal patterns and logic high signal patterns in the signal and generating a filtered signal for output. DME decoder 112 performs DME decoding on the filtered signal and generates for output a decoded signal.

Peak search circuitry 114, peak tracking circuitry 112, and data select circuitry 116 cooperate with one another to compensate for noise or interference distortion in the signal. In particular, peak search circuitry 114 detects peak values in the filtered signal from matching filters 110. Peak tracking circuitry 112 tracks the peak values in the signal to identify an optimal value among the peak values. Data select circuitry 116 selects a decision sample defined by a plurality of peaks, based on the peak tracking, extracts logic high and logic low signals values from the selected decision sample, and forwards the extracted data to boundary alignment circuitry. Boundary alignment circuitry 118 (e.g., for 5B/4B boundary alignment) performs boundary alignment in a known manner to align the boundaries of the data received from data select circuitry 116 (e.g., to map five-bit data values to four-bit data values), and outputs the boundary aligned signal to a downstream component (e.g., a physical coding sublayer) for processing.

TED 120, a DTL filter 122, and PI 124 form a digital timing loop. Timing error detector 120 detects a timing error based on the signal received at the physical layer transceiver. DTL filter 122 is a low-pass filter that filters out high frequency noise from the signal that was received at the physical layer transceiver, after detection of the timing error, if any, to keep only the error in the digital timing loop to enable correction of the sample phase. Phase interpolator 124 adjusts a sample clock phase of a sample clock used by ADC converter 104, for example, within fine increments of plus or minus 100 parts per million, to compensate for the timing error.

Spectrum-based collision avoidance module 126, as described in further detail below, performs spectral analysis of the received signal (e.g., as output by slicer 108) to determine whether another PHY is transmitting data on a multi-drop communication link, and, based on the determination control PHY 100 to permit or prevent its transmission of data, for collision avoidance.

Figure 2:
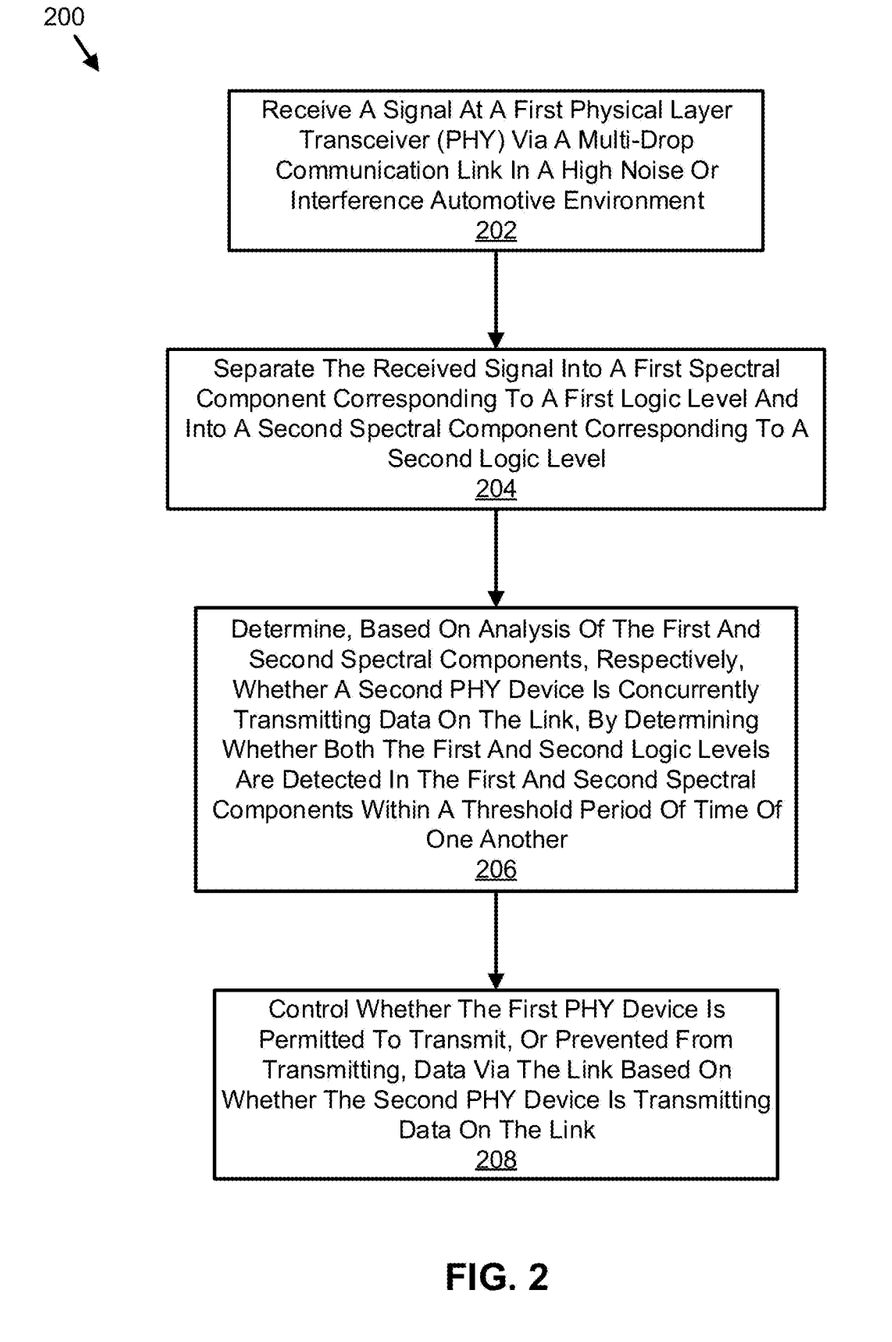
FIG. 2 is a flow diagram illustrating a method according to implementations of the subject matter of the present disclosure.

FIG. 2 is a flow diagram illustrating a method 200 for collision avoidance in a multi-drop communication network utilizing a physical layer transceiver, according to implementations of the subject matter of the present disclosure. At 202, a signal is received at a first physical layer transceiver (PHY) 100 via a multi-drop communication link in a high noise or interference automotive environment. At 204, spectrum-based collision detection circuitry 126 separates the received signal into a first spectral component corresponding to a first logic level and into a second spectral component corresponding to a second logic level. At 206, based on analysis of the first and second spectral components, respectively, spectrum-based collision detection circuitry 126 determines whether a second PHY device is concurrently transmitting data on the link, by determining whether both the first and second logic levels are detected in the first and second spectral components within a threshold period of time of one another. By using spectral analysis to detect the presence of both logic levels within a threshold period of time of one another, spectrum-based collision detection circuitry is made robust and immune to noise and interference and able to detect whether another PHY is transmitting data despite noise and interference prevalent in automotive environments. At 208, spectrum-based collision detection circuitry 126 controls whether the first PHY device is permitted to transmit, or prevented from transmitting, data via the link based on whether the second PHY device is transmitting data on the link.

Figure 3:
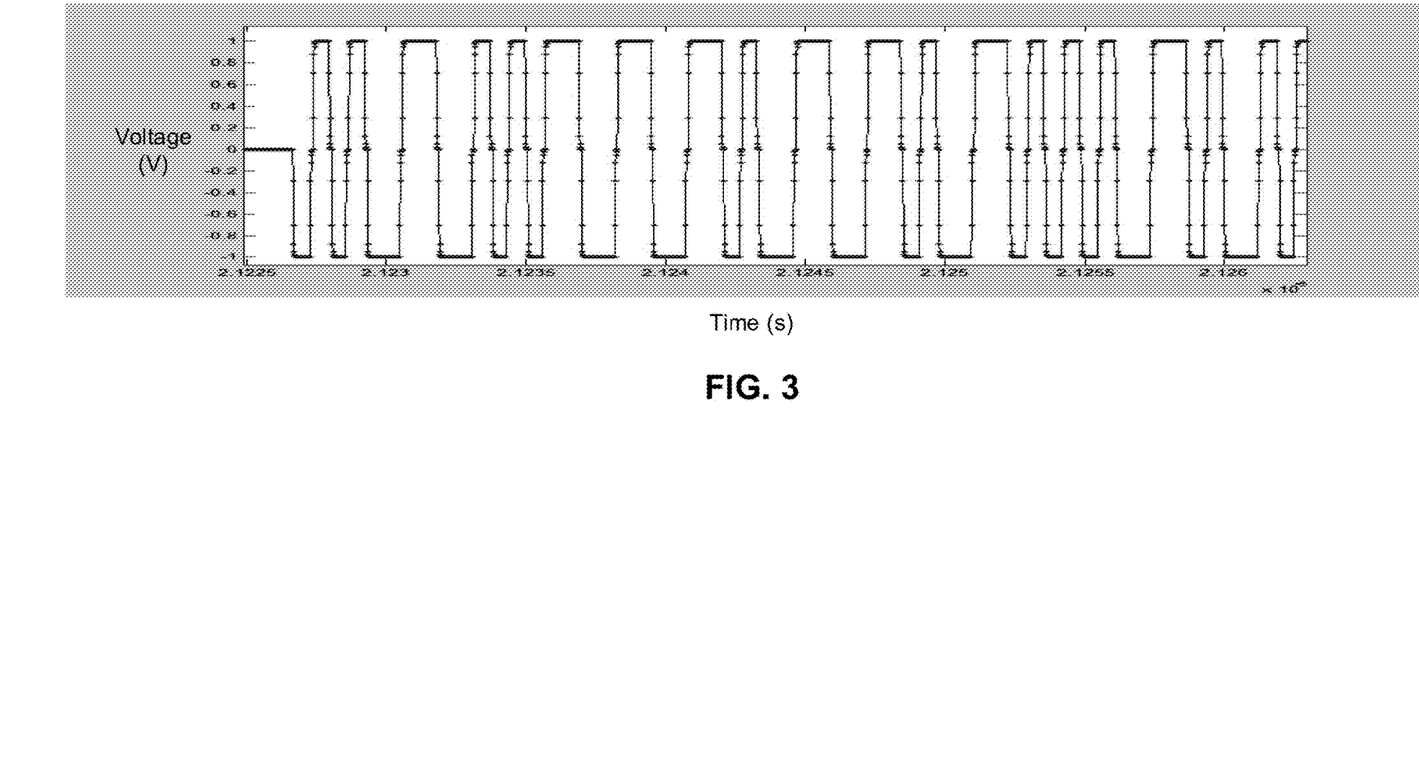
FIG. 3 is a graphical representation of a differential Manchester Encoded (DME) data signal, in accordance with an embodiment of the present disclosure.

FIG. 3 is a graphical representation of a DME data signal, in accordance with an embodiment of the present disclosure. DME waveforms have certain characteristics, as shown in the waveform of FIG. 3, which the PHYs, methods, and computer-readable media herein leverage for collision avoidance purposes. In one example, a DME-encoded logic zero corresponds to a low-frequency waveform (e.g., a first spectral component) centered around 6.25 MHz, and a DME-encoded logic one corresponds to a high frequency waveform (a second spectral component) centered around 12.5 MHz. In other embodiments, the frequencies can be generalized to frequency $f_0$ and frequency twice $f_0$—or $2 \times f_0$. The DME waveform 302 shown in FIG. 3 includes both spectral components, before any spectral separation has been performed, therefore the individual center frequency values of 6.25 MHz and 12.5 MHz are not readily apparent in FIG. 3. As described below, in embodiments of the present disclosure, spectrum-based DME avoidance module 126 separates a received signal into a first spectral component corresponding to a first logic level (e.g., waveform 502 shown in FIG. 5) and into a second spectral component corresponding to a second logic level (e.g., waveform 504 shown in FIG. 5). Based on analysis of the first and second spectral components, respectively, spectrum-based collision detection circuitry 126 determines whether a second PHY device is concurrently transmitting data on the link, and controls whether the first PHY device 100 is permitted to transmit, or prevented from transmitting, data via the link based on whether the second PHY device is transmitting data on the link.

Figure 4:
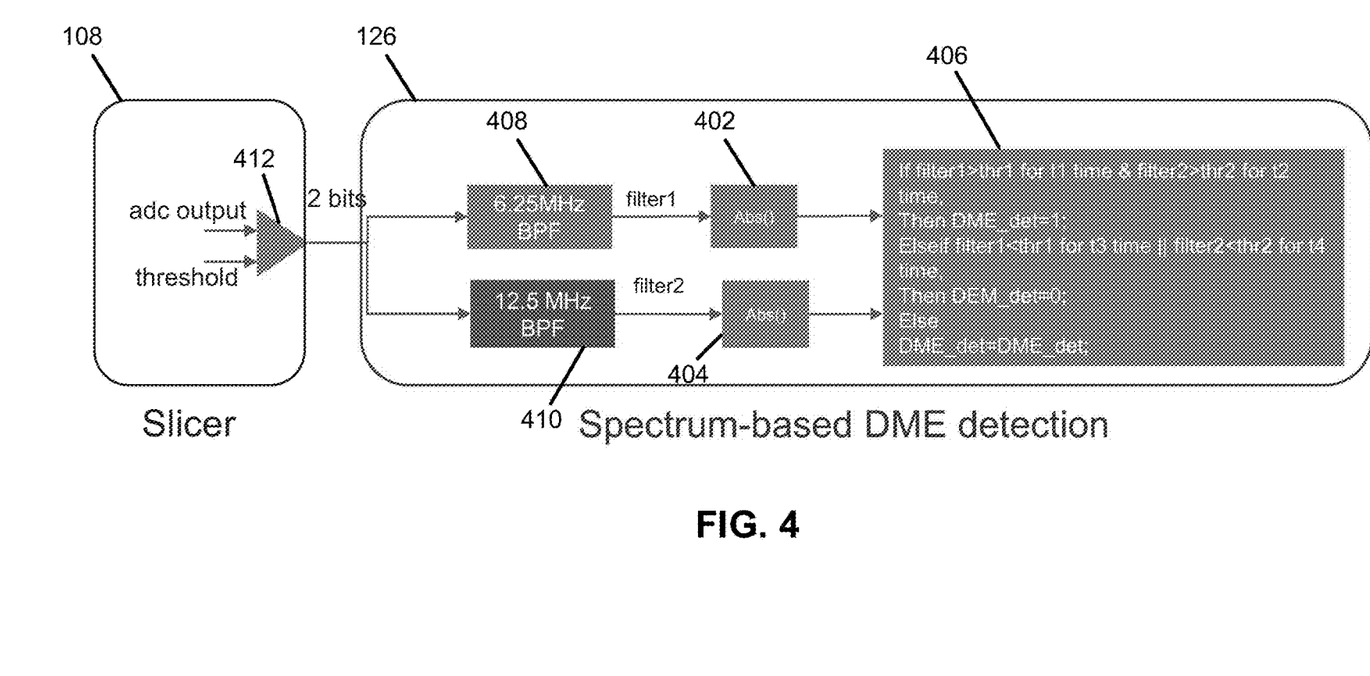
FIG. 4 is a block diagram of a slicer and a spectrum-based DME detection module of a physical layer transceiver, in accordance with an embodiment of the present disclosure.

FIG. 4 is a block diagram of slicer 108 and spectrum-based DME avoidance module 126 of physical layer transceiver 100, in accordance with an embodiment of the present disclosure. In some examples, spectrum-based DME avoidance module 126 begins to detect whether a DME encoded signal is present in a received signal by detecting that the first magnitude (determined by utilizing magnitude detector 402) exceeds a first magnitude threshold during a first time window and the second magnitude (determined by utilizing magnitude detector 404) exceeds a second magnitude threshold during a second time window. In response to detecting that the first magnitude exceeds the first magnitude threshold during the first time window and the second magnitude exceeds the second magnitude threshold during the second time window, spectrum-based DME avoidance module 126 (or control circuitry 406 thereof) determines that the DME encoded signal is present in the received signal. In response to determining that the DME encoded signal is present in the received signal, spectrum-based DME avoidance module 126 temporarily prevents the physical layer transceiver from transmitting data via the multi-drop communication link for at least a minimum time duration.

In some examples, spectrum-based DME avoidance module 126 begins detecting whether the DME encoded signal is present in the received signal by detecting that the first magnitude fails to exceed a first magnitude threshold during a first time window or the second magnitude fails to exceed a second magnitude threshold during a second time window. In response to detecting that the first magnitude fails to exceed the first magnitude threshold during the first time window or the second magnitude fails to exceed the second magnitude threshold during the second time window, spectrum-based DME avoidance module 126 determines that the DME encoded signal is absent from the received signal. In response to determining that the DME encoded signal is absent from the received signal, spectrum-based DME avoidance module 126 may permit the physical layer transceiver to transmit data via the multi-drop communication link.

In some examples, the first bandpass filter 408 has a first center frequency that corresponds to a first frequency (e.g., 6.25 MHz) of a logic zero DME signal and the second bandpass filter 410 has a second center frequency (e.g., 12.5 MHz) that corresponds to a second frequency of a logic one DME signal. The second center frequency, in various embodiments, may be selected to be approximately twice as large as the first center frequency.

In another aspect, the signal received at the PHY via the multi-drop communication link is fed through comparator 412 of slicer 108, the comparator 412 also being fed with a threshold voltage, to generate a filtered version of the received signal. The filtered version of the signal, instead of the signal received at the physical layer transceiver, is then fed to the first bandpass filter 408 and the second bandpass filter 410, with low amplitude noise being filtered out from the filtered version of the signal.

Figure 5:
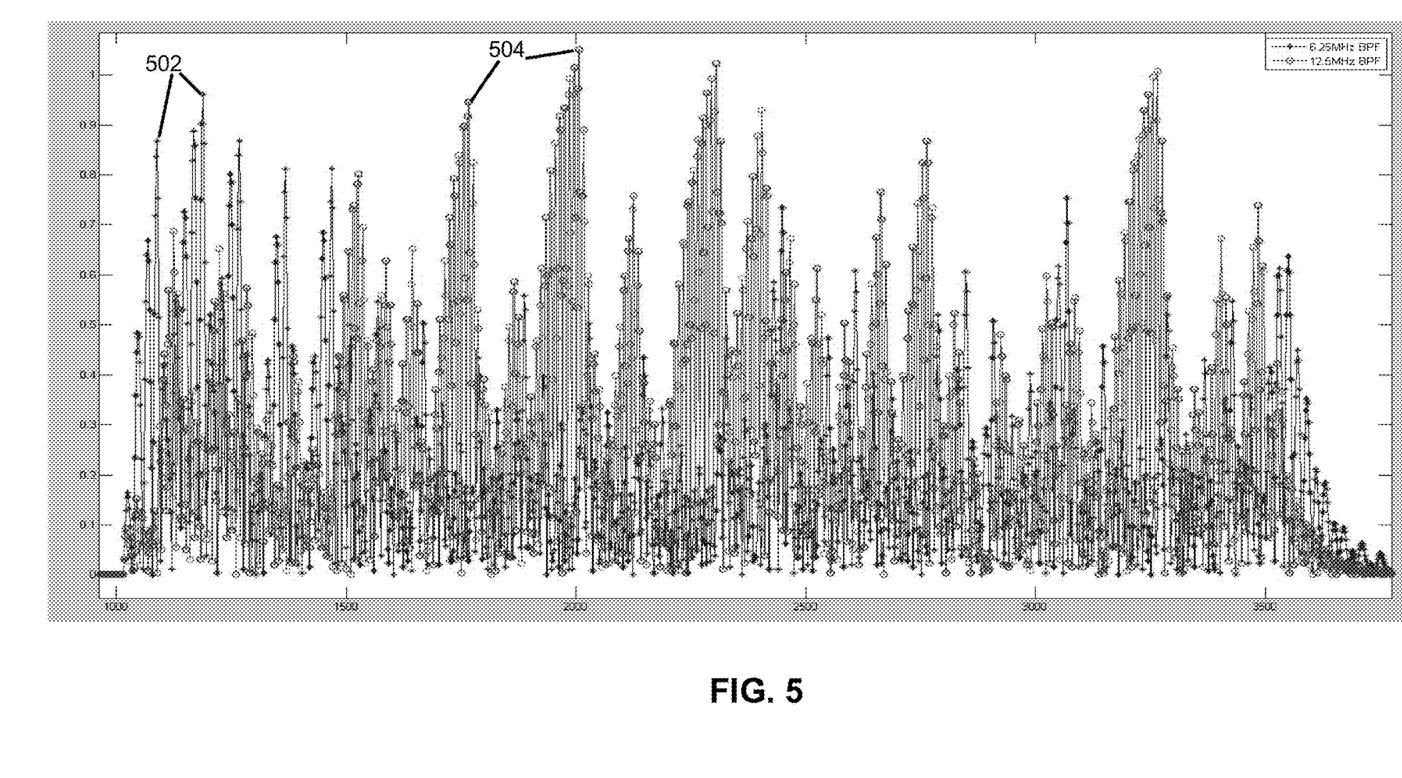
FIG. 5 is a graphical representation of bandpass filter output waveforms, in accordance with an embodiment of the present disclosure.

FIG. 5 is a graphical representation of bandpass filter output waveforms, in accordance with an embodiment of the present disclosure. As noted above, a DME-encoded logic zero corresponds to a low-frequency waveform (e.g., a first spectral component centered around 6.25 MHZ), and a DME-encoded logic one corresponds to a high frequency waveform (e.g., a second spectral component centered around 12.5 MHZ). The DME waveform 302 shown in FIG. 3 includes both spectral components, before any spectral separation has been performed. In embodiments of the present disclosure, spectrum-based DME avoidance module 126 separates DME waveform 302 into a first spectral component corresponding to a first logic level (e.g., waveform 502 shown in FIG. 5 and corresponding to a logic zero) and into a second spectral component corresponding to a second logic level (e.g., waveform 504 shown in FIG. 5 and corresponding to a logic one). That is, FIG. 5 shows a first waveform 502 (including periodic asterisks) that corresponds to an output of the first bandpass filter 408, and a second waveform 504 (including periodic circles) that corresponds to an output of the second bandpass filter 410. Based on analysis of the first and second spectral components, respectively, spectrum-based collision detection circuitry 126 determines whether a second PHY device is concurrently transmitting data on the link, and controls whether the first PHY device 100 is permitted to transmit, or prevented from transmitting, data via the link based on whether the second PHY device is transmitting data on the link.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure without departing from the scope of the claims.

While operations are depicted in the drawings in a particular order, this is not to be construed as requiring that such operations be performed in the particular order shown or in sequential order, or that all illustrated operations be performed to achieve the desirable results.

What is claimed is:

1. A method for using a physical layer transceiver of an automobile to avoid data signal collision on a high noise or interference automotive multi-drop communication link, the method comprising:
   receiving a signal at a first physical layer transceiver (PHY) device via a multi-drop communication link in a high noise or interference automotive environment, wherein the signal comprises noise or interference, present on the link, caused by the automotive environment regardless of whether data is being transmitted on the link;
   determining whether a data transmission from a second PHY device is present within the noise or interference by:
      separating the received signal into a first spectral component centered around a first frequency corresponding to a first logic level and into a second spectral component centered around a second frequency corresponding to a second logic level;
      analyzing the first and second spectral components to determine whether both the first and second logic levels are detected in the first and second spectral components within a threshold period of time of one another; and
      determining, based on the analyzing, whether the second PHY device is concurrently transmitting data on the link; and
   in response to determining that a data transmission is not present within the noise or interference, permitting the first PHY device to transmit data via the link, and
   in response to determining that a data transmission is present within the noise or interference, preventing the first PHY device from transmitting data via the link.

2. The method claimed in claim 1,
   wherein separating the received signal into the first spectral component and the second spectral component comprises:
      feeding the received signal through a first bandpass filter to generate the first spectral component of the received signal; and
      feeding the received signal through a second bandpass filter to generate the second spectral component of the received signal; and
   wherein analyzing the first and second spectral components comprises:
      determining a first magnitude of the first spectral component and a second magnitude of the second spectral component; and
      detecting whether a differential Manchester Encoding (DME) encoded signal is present in the received signal by comparing the first magnitude and second magnitude to one or more thresholds.

3. The method claimed in claim 2, wherein the detecting whether the DME encoded signal is present in the received signal comprises:
   detecting that the first magnitude exceeds a first magnitude threshold during a first time window and the second magnitude exceeds a second magnitude threshold during a second time window; and
   in response to detecting that the first magnitude exceeds the first magnitude threshold during the first time window and the second magnitude exceeds the second magnitude threshold during the second time window, determining that the DME encoded signal is present in the received signal.

4. The method claimed in claim 3, further comprising:
   in response to determining that the DME encoded signal is present in the received signal, temporarily preventing the physical layer transceiver from transmitting data via the multi-drop communication link for at least a minimum time duration.

5. The method claimed in claim 2, wherein the detecting whether the DME encoded signal is present in the received signal comprises:
   detecting that the first magnitude fails to exceed a first magnitude threshold during a first time window or the second magnitude fails to exceed a second magnitude threshold during a second time window; and
   in response to detecting that the first magnitude fails to exceed the first magnitude threshold during the first time window or the second magnitude fails to exceed the second magnitude threshold during the second time window, determining that the DME encoded signal is absent from the received signal.

6. The method claimed in claim 5, further comprising:
   in response to determining that the DME encoded signal is absent from the received signal, permitting the physical layer transceiver to transmit data via the multi-drop communication link.

7. The method claimed in claim 2, wherein the first bandpass filter has a first center frequency that corresponds to a first frequency of a logic zero DME signal and the second bandpass filter has a second center frequency that corresponds to a second frequency of a logic one DME signal.

8. The method claimed in claim 7, wherein the second center frequency is selected to be approximately twice as large as the first center frequency.

9. The method claimed in claim 2, further comprising feeding the received signal through a comparator fed with a threshold voltage to generate a filtered version of the received signal, wherein the filtered version of the signal is fed to the first bandpass filter and the second bandpass filter instead of the signal received at the physical layer transceiver, low amplitude noise being filtered out from the filtered version of the signal.

10. A physical layer transceiver (PHY) device for avoiding data signal collision on a high noise or interference automotive multi-drop communication link of an automobile, the PHY device comprising:
   an input port configured to receive a signal via a multi-drop communication link in a high noise or interference automotive environment, wherein the signal comprises noise or interference, present on the link, caused by the automotive environment regardless of whether data is being transmitted on the link; and
   control circuitry configured to:
      determine whether a data transmission from a second PHY device is present within the noise or interference by:
         separating the received signal into a first spectral component centered around a first frequency corresponding to a first logic level and into a second spectral component centered around a second frequency corresponding to a second logic level;
         analyzing the first and second spectral components to determine whether both the first and second logic levels are detected in the first and second spectral components within a threshold period of time of one another; and
         determining, based on the analysis, whether the second PHY device is concurrently transmitting data on the link; and in response to determining that a data transmission is not present within the noise or interference, permit the PHY device to transmit data via the link, and in response to determining that a data transmission is present within the noise or interference, prevent the PHY device from transmitting data via the link.

11. The PHY device claimed in claim 10, further comprising:

a first bandpass filter configured to generate the first spectral component of the received signal;

a second bandpass filter configured to generate the second spectral component of the received signal;

a first magnitude detector configured to determine a first magnitude of the first spectral component; and a second magnitude detector configured to determine a second magnitude of the second spectral component;

and wherein the control circuitry is further configured to detect whether a differential Manchester Encoding (DME) encoded signal is present in the received signal by comparing the first magnitude and second magnitude to one or more thresholds.

12. The PHY device claimed in claim 11, wherein the control circuitry is configured to detect whether the DME encoded signal is present in the received signal by:

detecting that the first magnitude exceeds a first magnitude threshold during a first time window and the second magnitude exceeds a second magnitude threshold during a second time window; and in response to detecting that the first magnitude exceeds the first magnitude threshold during the first time window and the second magnitude exceeds the second magnitude threshold during the second time window, determining that the DME encoded signal is present in the received signal.

13. The PHY device claimed in claim 12, wherein the control circuitry is further configured to:

in response to determining that the DME encoded signal is present in the received signal, temporarily prevent the PHY device from transmitting data via the multi-drop communication link for at least a minimum time duration.

14. The PHY device claimed in claim 11, wherein the control circuitry is configured to detect whether the DME encoded signal is present in the received signal by:

detecting that the first magnitude fails to exceed a first magnitude threshold during a first time window or the second magnitude fails to exceed a second magnitude threshold during a second time window; and in response to detecting that the first magnitude fails to exceed the first magnitude threshold during the first time window or the second magnitude fails to exceed the second magnitude threshold during the second time window, determining that the DME encoded signal is absent from the received signal.

15. The PHY device claimed in claim 14, wherein the control circuitry is further configured to:

in response to determining that the DME encoded signal is absent from the received signal, permit the PHY device to transmit data via the multi-drop communication link.

16. The PHY device claimed in claim 11, wherein the first bandpass filter has a first center frequency that corresponds to a first frequency of a logic zero DME signal and the second bandpass filter has a second center frequency that corresponds to a second frequency of a logic one DME signal.

17. The PHY device claimed in claim 16, wherein the second center frequency is selected to be approximately twice as large as the first center frequency.

18. The PHY device claimed in claim 11, further comprising a comparator fed with a threshold voltage and configured to generate a filtered version of the received signal, wherein the filtered version of the signal is fed to the first bandpass filter and the second bandpass filter instead of the signal received at the PHY device, low amplitude noise being filtered out from the filtered version of the signal.

19. A non-transitory computer-readable medium having instructions stored thereon that, when executed by control circuitry, cause the control circuitry to:

receive a signal at a first physical layer transceiver (PHY) device via a multi-drop communication link in a high noise or interference automotive environment, wherein the signal comprises noise or interference, present on the link, caused by the automotive environment regardless of whether data is being transmitted on the link;

determine whether a data transmission from a second PHY device is present within the noise or interference by:

separating the received signal into a first spectral component centered around a first frequency corresponding to a first logic level and into a second spectral component centered around a second frequency corresponding to a second logic level;

analyzing the first and second spectral components to determine whether both the first and second logic levels are detected in the first and second spectral components within a threshold period of time of one another; and determining, based on the analysis, whether the second PHY device is concurrently transmitting data on the link; and in response to determining that the data transmission is not present within the noise or interference, permit the first PHY device to transmit data via the link, and in response to determining that the data transmission is present within the noise or interference, preventing the first PHY device from transmitting data via the link.

20. The non-transitory computer-readable medium claimed in claim 19, further having instructions stored thereon that, when executed by the control circuitry, cause the control circuitry to:

feed the received signal through a first bandpass filter to generate the first spectral component of the received signal;

feed the received signal through a second bandpass filter to generate the second spectral component of the received signal;

determine a first magnitude of the first spectral component and a second magnitude of the second spectral component; and detect whether a differential Manchester Encoding (DME) encoded signal is present in the received signal based on the first magnitude and second magnitude.

* * * * *